US010218787B2

(12) United States Patent
Toillon et al.

(10) Patent No.: US 10,218,787 B2
(45) Date of Patent: Feb. 26, 2019

(54) DIGITAL DATA EXCHANGE ARCHITECTURE USABLE IN AVIONIC APPLIATIONS

(71) Applicant: Thales, Courbevoie (FR)

(72) Inventors: Patrice Georges Paul Toillon, Meudon la Foret (FR); Vincent Christophe Cedric Sollier, Meudon la Foret (FR); Paul Marie Boivin-Champeaux, Meudon la Foret (FR); David Jose Faura, Meudon la Foret (FR)

(73) Assignee: THALES, Courbevoie (FR)

( * ) Notice: Subject to any disclaimer, the term of this patent is extended or adjusted under 35 U.S.C. 154(b) by 384 days.

(21) Appl. No.: 14/864,332

(22) Filed: Sep. 24, 2015

(65) Prior Publication Data

US 2016/0142480 A1    May 19, 2016

(30) Foreign Application Priority Data

Sep. 24, 2014   (FR) ..................... 14 02143

(51) Int. Cl.
*G06F 15/16* (2006.01)
*H04L 29/08* (2006.01)
*H04J 3/06* (2006.01)

(52) U.S. Cl.
CPC ........ *H04L 67/1095* (2013.01); *H04J 3/0658* (2013.01); *H04J 3/0673* (2013.01); *H04L 67/12* (2013.01)

(58) Field of Classification Search
CPC ....... H04L 67/1095; H04L 67/12; H04L 7/00; H04L 12/422; H04L 2012/5674;
(Continued)

(56) References Cited

U.S. PATENT DOCUMENTS

2009/0141725 A1* 6/2009 Bedrosian ............. H04J 3/0658
 370/392
2009/0252169 A1* 10/2009 Uchimoto ........... H04L 12/5601
 370/395.1
(Continued)

FOREIGN PATENT DOCUMENTS

EP    2490357 A2    8/2012

OTHER PUBLICATIONS

AFDX Protocol Tutorial by Condor Engineering (2005) p. 16.*
(Continued)

*Primary Examiner* — Oleg Survillo
*Assistant Examiner* — Tan Doan
(74) *Attorney, Agent, or Firm* — Thompson Coburn LLP (57) ABSTRACT

This digital data exchange architecture includes at least one communication network having at least one communication plane, a plurality of pieces of subscriber electronic equipment, and several switches. Each switch includes means forming a time referencing server able to: generate a local current time reference; transmit this local current time reference generated on the corresponding communication plane via a frame; receive via one or several frames the current time references generated by at least some of the switches of the corresponding communication plane; analyze the received current time references, in order to generate a local following time reference according to a predetermined generation law; and associate the local following time reference with the local current time reference.

15 Claims, 2 Drawing Sheets

(58) Field of Classification Search
CPC ...... H04J 3/0658; H04J 3/0673; H04J 3/0694; H04J 3/0697
USPC ........................................................ 709/248
See application file for complete search history.

(56) References Cited

U.S. PATENT DOCUMENTS

| | | | | |
|---|---|---|---|---|
| 2011/0025391 | A1* | 2/2011 | Amrutur | G01R 31/3016 327/170 |
| 2013/0279525 | A1* | 10/2013 | Zheng | H04J 3/0667 370/516 |
| 2013/0322458 | A1* | 12/2013 | Nagumo | H04L 45/28 370/401 |

OTHER PUBLICATIONS

"AFDX©/ARINC 664—Tutorial", Aug. 29, 2008, pp. 1-30, online, retrieved on Jun. 23, 2015,<http://www.techsat.com/fileadmin/media/pdf/infokiosk/TechSat_TUT-AFDX-EN.pdf>.
"IEEE Standard for a Precision Clock Synchronization Protocol for Networked Measurement and Control Systems", IEEE Standard 1588, Jul. 24, 2008.
Riesch et al., "Measurement of Egress and Ingress Delays of PTP Clocks", IEEE International Symposium on Precision Clock Synchronization for Measurement, Control and Communication (ISPCS) Proceedings, Sep. 22, 2013, pp. 113-118.
Search Report for FR Application 1402143 dated Jun. 30, 2015.

\* cited by examiner

DIGITAL DATA EXCHANGE ARCHITECTURE USABLE IN AVIONIC APPLIATIONS

CROSS-REFERENCE TO RELATED APPLICATIONS

This application claims the benefit of French Application FR 1402143, filed Sep. 24, 2014, which is incorporated herein by reference in its entirety.

FIELD OF THE INVENTION

The present invention relates to a digital data exchange architecture usable in avionic applications.

More particularly, the invention relates to such an architecture, at least including:
a switched avionic communication network, able to transmit digital data and having at least one communication plane;
a plurality of pieces of electronic equipment subscribed to one or several communication planes of the communication network and able to transmit and/or receive digital data via this network; and
one or several digital data switches per communication plane, each switch including at least:
  one digital data switching unit in the communication network;
  one digital data processing unit;
  one local interaction unit connecting the switching unit and the processing unit;
  the processing unit being able to transmit and receive digital data via the local interaction unit.

BACKGROUND OF THE INVENTION

Generally, in the case of on-board communication systems of the Ethernet type and notably of avionic communication systems of the ARINC 664 type, the subscriber pieces of equipment are asynchronous. There also exist avionic communication systems which do not require synchronization or phasing between the subscriber pieces of equipment.

This in particular means that the exchanges of frames circulating in such a communication system are not synchronized during reception or transmission of frames by the subscriber pieces of equipment.

It appears that in certain cases of applications of these communication systems, the techniques for exchanging frames used do not give the possibility of meeting a certain number of present needs.

An example of such a need is the monitoring of the communication system by means of detections for example of delays from abnormal propagation or frame-crossing between the subscriber pieces of equipment, i.e. at the intermediate communication pieces of equipment such as for example the switches.

Another example is formed with consistency needs with the dating of events globally, i.e. at the communication system.

The present invention has the purpose of meeting these needs.

SUMMARY OF THE INVENTION

For this purpose, the object of the invention is a digital data exchange architecture which may be used in avionic applications, wherein the processing unit of each switch of each communication plane includes means forming a time referencing server able:
  to generate a local current time reference;
  to transmit this generated local current time reference over the corresponding communication plane via a frame;
  to measure the local transmission time aging of this local current time reference in order to generate at least one piece of local transmission aging information relating to this time reference;
  to transmit this local transmission aging information generated over the corresponding communication plane via a frame;
  to receive via one or several frames, the current time references generated by at least some of the switches of the corresponding communication plane;
  to measure the local receiving time aging of each of the current time references in order to generate at least one piece of local receiving aging information relating to this time reference;
  to measure the local switching unit crossing time aging of the current time references in order to generate at least one piece of local crossing aging information relating to this time reference;
  to transmit the generated local crossing aging information to one of the corresponding communication plane via one or several frames;
  to receive via one or several frames, transmission and crossing aging information, transmitted by at least some of the other switches of the corresponding communication plane;
  to analyze the received current time references, the local receiving aging information, the received transmission and crossing aging information, corresponding to these time references in order to generate a next local time reference according to a predetermined law for generating a local time reference; and
  to associate the next local time reference with the local current time reference.

According to other advantageous aspects of the invention, the digital data exchange architecture comprises one or several of the following features, taken individually or according to all the technically possible combinations:
  the means forming a time referencing server are further capable:
    of generating a local confidence index relating to each received time reference;
    of transmitting this generated local confidence index;
    of receiving via one or several frames, the confidence indexes transmitted by at least some of the switches of the corresponding communication plane;
    of analyzing the received current time references, the local receiving aging information, the received transmission and crossing aging information, the local confidence indexes and the received confidence indexes corresponding to these time references in order to generate a next local time reference;
  each switch is able to transmit each local time reference and/or each piece of local transmission aging information and/or each piece of local crossing aging information and/or each local confidence index via at least two frames following physically segregated paths and intended for at least some of the switches of the corresponding switching plane;
  each subscriber piece of electronic equipment includes a time reference unit capable:

of receiving via one or several frames, one or several current time references transmitted by the switches of the communication plane(s) to which the corresponding piece of electronic equipment is subscribed;

of measuring the local receiving time aging of each of the current time references for generating at least one piece of local receiving aging information relating to this time reference;

of receiving via one or several frames, the transmission and crossing aging information transmitted by at least some of the switches of the communication plane(s) to which the corresponding piece of electronic equipment is subscribed;

of receiving a confidence index relating to each received current time reference;

of differentiating the received current time reference(s), the local receiving aging information, the received receiving and crossing aging information and the received confidence indexes corresponding to these time references, according to the transmission communication plane; and of analyzing the received current time reference(s) from a same communication plane, the receiving local aging information, the received receiving and crossing aging information, and the received confidence indexes corresponding to these time references, in order to generate a subscriber time reference for this communication plane, according to a predetermined law for generating a subscriber time reference;

the time reference unit of each subscriber piece of electronic equipment is further able to analyze the received current time reference(s), the local receiving aging information, the received receiving and crossing aging information, and the received confidence indexes corresponding to these time references, from different communication planes, to which this piece of equipment is subscribed, in order to generate a common subscriber time reference for at least some of these communication planes, according to a predetermined law for generating a subscriber time reference according to the received confidence indexes;

the time reference unit of each subscribed piece of electronic equipment is further able to analyze the received current time reference(s), the local receiving aging information, the received receiving and crossing aging information, and the received confidence indexes corresponding to these time references, from the whole of the communication planes, to which this piece of equipment is subscribed, in order to generate a common subscriber time reference for this set of communication planes, according to a predetermined law for generating a subscriber time reference according to the received confidence indexes;

said or each law for generating a subscribed time reference may be configured within each subscriber piece of electronic equipment;

the law for generating a local time reference may be configured within each switch;

each switch further includes a local clock allowing it to generate a local current time reference;

at least some of the communication planes further include a global clock allowing at least some of the switches to generate a local current time reference;

the global clock of at least some of the communication planes is associated with a group of communication planes;

each switch is able to transmit a local current time reference with the highest priority level in the corresponding communication plane;

the implementation of the communication network is compliant with the ARINC 664 standard;

the contents of said or each frame comprising one or several time references and/or one or several pieces of receiving and crossing aging information, is invariant during each passing of the frame through the switches; and the contents of said or each frame comprising one or several confidence indexes is invariant during each passing of this frame through the switches.

BRIEF DESCRIPTION OF THE DRAWINGS

The features and advantages of the invention will become apparent upon reading the description which follows, only given as a non-limiting example and made with reference to the appended drawings, wherein.

DETAILED DESCRIPTION OF THE INVENTION

Figure 1:
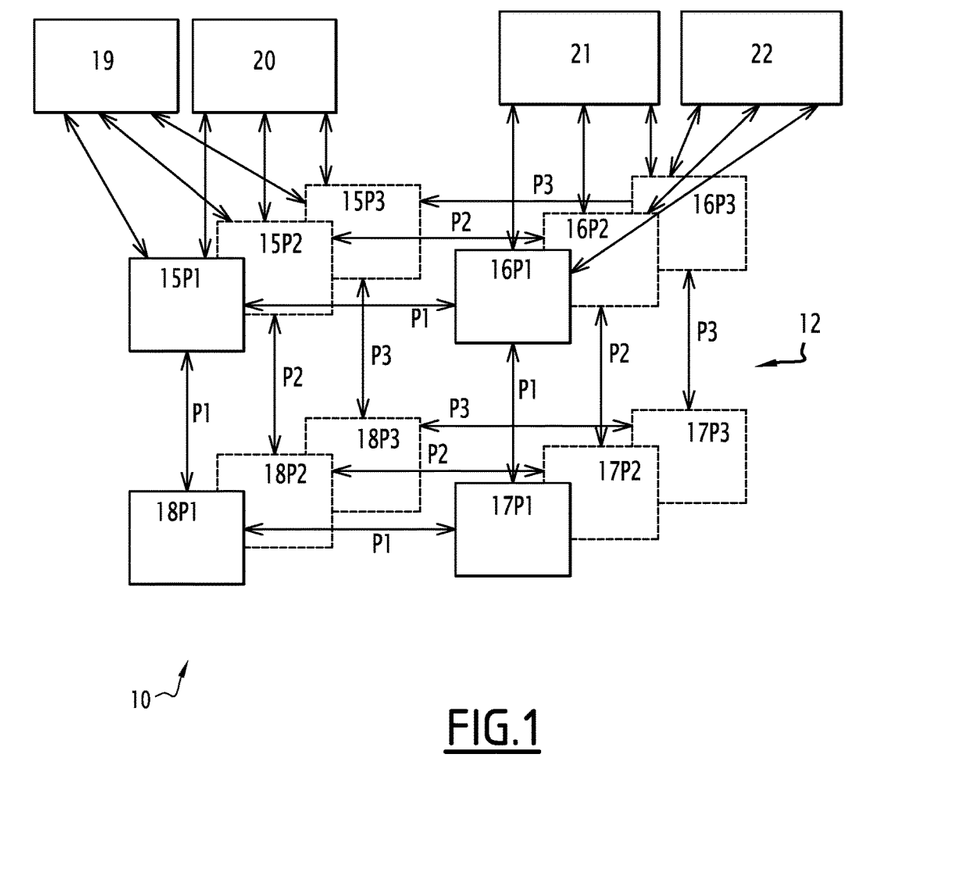
FIG. 1 is a schematic view of a digital data exchange architecture according to the invention.

In FIG. 1, a digital data exchange architecture has actually been illustrated in FIG. 1 according to the invention which is designated by the general reference 10 in this figure.

This architecture 10 may notably be used in critical avionic applications and more generally in any other field of onboard systems.

The architecture 10 gives the possibility of publishing and distributing time references as this will be explained in more detail subsequently.

According to FIG. 1, the architecture 10 includes a switched avionic communication network for example having three communication planes P1, P2, P3, four pieces of electronic equipment subscribed to these communication planes P1, P2, P3, and four switches per communication plane.

Of course, the invention may be applied to a number of communication planes less or greater than three.

More particularly, the communication network is designated by the general reference 12 in FIG. 1 and is able to transmit digital data between the switches and the subscriber equipment.

The implementation of the network 12 for example is compliant with the ARINC 664 standard. The digital data for example appear as frames T of digital data.

The communication planes P1, P2, P3 allow transmission of the digital data independently of each other. More generally, these planes ensure segregation of the transmitted digital data optionally having different criticality levels. Still more generally, these planes ensure availability of the transmitted digital data.

In FIG. 1, the switches corresponding to the communication plane P1 are designated by the general references 15P1 to 18P1, the switches corresponding to the plane P2 by the general references 15P2 to 18P2, the switches corresponding to the plane P3 by the general references 15P3 to 18P3 and the pieces of electronic equipment by the general references 19, 20, 21 and 22.

The switches substantially have the same structure. Thus, only the switch 15P1 will be described in detail subsequently, with reference to FIG. 2.

Figure 2:
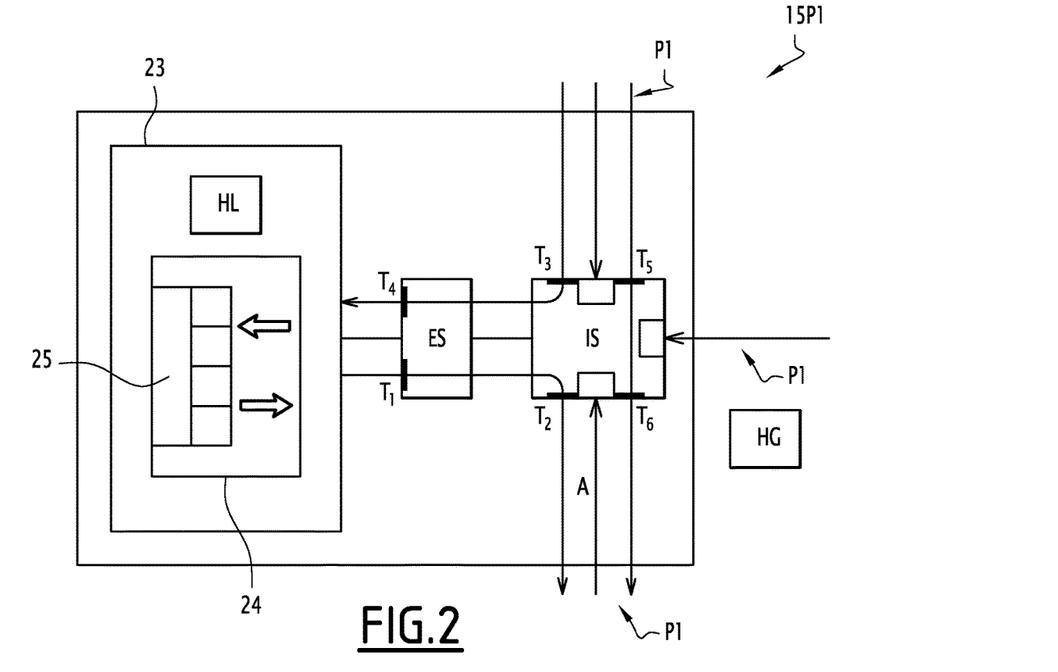
FIG. 2 is a schematic view of a switch belonging to the architecture of FIG. 1.

FIG. 2 actually illustrates an exemplary embodiment of the switch 15P1.

Thus, as illustrated in this FIG. 2, the switch 15P1 includes a switching unit IS connected to the communications network 12 and in particular, to the communication plane P1 of this network 12.

The communication unit IS allows switching of the digital data and in particular of the frames T, in the corresponding communication plane. The communication unit IS notably gives the possibility of transmitting frames transmitted by one of the switches 15P1 to 18P1 towards one of the switches 15P1 to 18P1.

The switch 15P1 further includes a digital data processing unit designated by the general reference 23 in FIG. 2, and a local interaction unit ES connecting the switching unit IS to the processing unit 23 and vice versa, via subscription means.

The subscription means give the possibility of managing the subscription of the switch 15P1 to the network 12 and in particular to the communication plane P1.

The processing unit 23 is able to transmit and receive digital data on the corresponding communication plane via the local interaction unit ES connected to the communications network 12 via the switching unit IS. The digital data are for example transmitted as data frames T.

According to the invention, the processing unit 23 includes means forming a time referencing server. This server is designated by the general reference 24 in FIG. 2 and gives the possibility of associating a time reference RT with this switch 15P1 and optionally evaluating its aging.

To do this, the time referencing server 24 includes a memory designated by the general reference 25 in FIG. 2 and able to store a predetermined law LC for generating a local time reference $RT_{loc}$.

The server 24 further includes a local clock HL allowing it to generate this local time reference $RT_{loc}$ at least initially.

The local clock HL further allows the server 24 to measure the aging of the local time references $RT_{loc}$ as this will be explained later on.

Alternatively, the server 24 is connected to a global clock HG for the whole communication plane P1 or at least for a group of switches 15P1 to 18P1 of this communication plane P1. In this case, the server 24 is able to generate the local time reference $RT_{loc}$ at least initially by means of this global clock HG.

The generation law LC may for example be configured within the switch 15P1 and gives the possibility of generating a plurality of local current time references $RT_{loc\ j}$ corresponding to different time instants.

The server 24 is moreover able to transmit each local current time reference $RT_{loc\ j}$ generated on the corresponding communication plane via a frame T. Thus, in the notation «$RT_{loc\ j}$», the index j is an ordering index corresponding to a distinct occurrence of the frame T associated with this time reference $RT_{loc\ j}$.

The reference $RT_{loc\ j}$ is for example transmitted with the highest priority level in the communication plane P1.

For each transmission of a local current time reference $RT_{loc\ j}$, the server 24 is further able to determine by using the local local clock HL, a time instant $T_1$ of the passing of the local current time reference $RT_{loc\ j}$ via the local interaction unit ES, and a time instant $T_2$ of the passing of the same local current time reference $RT_{loc\ j}$ via the switching unit IS.

The server 24 is thereby capable of measuring the local transmission time aging of each of the local transmitted current time references $RT_{loc\ j}$ for generating at least one piece of local transmission aging information $V_{loc\ Xmit}$ ($RT_{loc\ j}$) corresponding to the transmission duration of this time reference $RT_{loc\ j}$. In other words, $$V_{loc\ Xmit}(RT_{loc\ j}) = T_2 - T_1.$$

The server 24 is further able to transmit the piece of local transmission aging information $V_{loc\ Xmit}$ ($RT_{loc\ j}$) generated in the communication plane P1 via one or several frames T.

The server 24 is further able to receive via one or several frames T the current time references $RT_{ij}$ generated by at least some of the switches 15P1 to 18P1 of the communication plane P1, wherein the index i corresponds to an identifier of the switch 15P1 to 18P1 having transmitted this reference $RT_{ij}$, and the index j like in the preceding case corresponds to the ordering index.

For each reception of a current time reference $RT_{ij}$, the server 24 is further able to determine by using the local clock HL, a time instant $T_3$ of the passing of the current time reference $RT_{ij}$ via the switching unit IS, and a time instant $T_4$ of the passing of the same current time reference $RT_{ij}$ via the local interaction unit ES.

The server 24 is thus able to measure the local receiving time aging of each of the received current time references $RT_{ij}$ in order to at least generate a local reception aging information $V_{loc\ receive}$ ($RT_{i\ j}$), corresponding to the reception duration of this time reference $RT_{ij}$. In other words, $$V_{loc\ receive}(RT_{ij}) = T_4 - T_3.$$

Further, for each current time reference $RT_{ij}$ transmitted via the switching unit IS of the switch 15P1 and generated by one of the switches 16P1 to 18P1 of the communication plane P1 distinct from the switch 15P1, the server 24 is further able to determine by using the local clock HL, a time instant $T_5$ for entry of the current time reference $RT_{ij}$ into the switching unit IS, and a time instant $T_6$ for the exit of the current time reference $RT_{ij}$ from the switching unit IS.

The server 24 is thus able to measure the local crossing time aging of the switching unit IS by each of the time references $RT_{ij}$ generated by at least some of the switches 16P1 to 18P1 of the communication plane P1, in order to generate at least one piece of local crossing aging information $V_{loc\ IS}$ ($RT_{ij}$) relatively to the time for crossing the switching unit IS of this time reference $RT_{ij}$. In other words, $$V_{loc\ IS}(RT_{ij}) = T_6 - T_5.$$

The server 24 is further able to transmit the local crossing aging information $V_{loc\ IS}$ ($RT_{ij}$) in the communication plane P1 via one or several frames T.

The server 24 is able to receive via one or several frames T the transmission aging information $V_{k\ Xmit}(RT_{kj})$ relative to the transmission duration of the time reference $RT_{k\ j}$ and transmitted by the switch 15P1 to 18P1 corresponding to the index k.

The server 24 is further able to receive via one or several frames T the crossing aging information $V_{k\ IS}(RT_{ij})$ relative to the crossing time of the time reference $RT_{ij}$ through the switching unit IS of the switch 15P1 to 18P1 corresponding to the index k.

The server 24 is able to analyze the received current time references $RT_{ij}$, the local reception aging information $V_{loc\ receive}(RT_{ij})$, the received pieces of transmission $V_{k\ Xmit}(RT_{kj})$ and crossing $V_{k\ IS}(RT_{ij})$ aging information for elaborating an estimation of the local time for each of the switches belonging to the plane P1, itself included, at the instants for receiving each of the received current time references $RT_{ij}$.

The server 24 is able to analyze the different estimations of the local time elaborated previously of each of the switches 15P1 to 18P1 belonging to the plane P1 for elaborating local confidence indexes $I_{loc}(RT_{ij})$ for each current time reference $RT_{ij}$.

The server 24 is able to transmit the corresponding local confidence indexes $I_{loc}(RT_{ij})$, in the communication plane P1 via one or several frames T.

The server 24 is moreover able to receive via one or several frames T, the corresponding confidence indexes $I_k(RT_{ij})$, transmitted by at least some of the other switches 16P1 to 18P1 of the communication plane P1, wherein the index k corresponds to the identifier of the switch 16P1 to 18P1 having transmitted this information.

Finally, the server 24 is able to analyze the received current time references $RT_{ij}$, the local receiving aging information $V_{loc\ receive}(RT_{ij})$, the transmission aging information $V_{k\ Xmit}(RT_{ij})$ and the received crossing aging information $V_{k\ IS}(RT_{ij})$, the local confidence indexes $I_{loc}(RT_{ij})$ and the received confidence indexes $I_k(RT_{ij})$ corresponding to these time references $RT_{ij}$ for generating a next local time reference $RT_{loc\ j+1}$ according to the generation law LC.

The generation law LC is thus for example based on the comparison of each of the received time references $RT_{ij}$ and on the analysis of the corresponding aging information as well as on the local confidence indexes $I_{loc}(RT_{ij})$ and the received confidence indexes $I_k(RT_{ij})$.

Alternatively, the generation law LC adds to the local current time reference $RT_{loc\ j}$ the average of the deviations between the instant for receiving each time reference $RT_{ij}$ and the estimation of the local time of the switch transmitting the time reference at the instant of receiving the time reference by the switch 15P1.

Preferably, the generation law LC calculates the whole of the deviations between the instant of reception of each time reference $RT_{ij}$ by the switch 15P1 and the estimation of the local time of the transmitter switch of the time reference at the instant of reception of the time reference by the switch 15P1, in order to establish a local confidence index.

This local index is then relative to the switch 15P1, and may be published via the communication plane P1 so as to be taken into account by other switches of the communication plane P1 and/or by the pieces of equipment having subscribed to this communication plane P1.

Each subscriber piece of equipment 19 to 22 for example has an onboard computer or any other avionic piece of equipment able to communicate with each communication plane P1, P2, P3 to which it is subscribed by sending and receiving data frames T.

These pieces of equipment 19 to 22 substantially have the same structure. Thus, only the piece of equipment 19 will be described in detail subsequently, with reference to FIG. 3.

Figure 3:
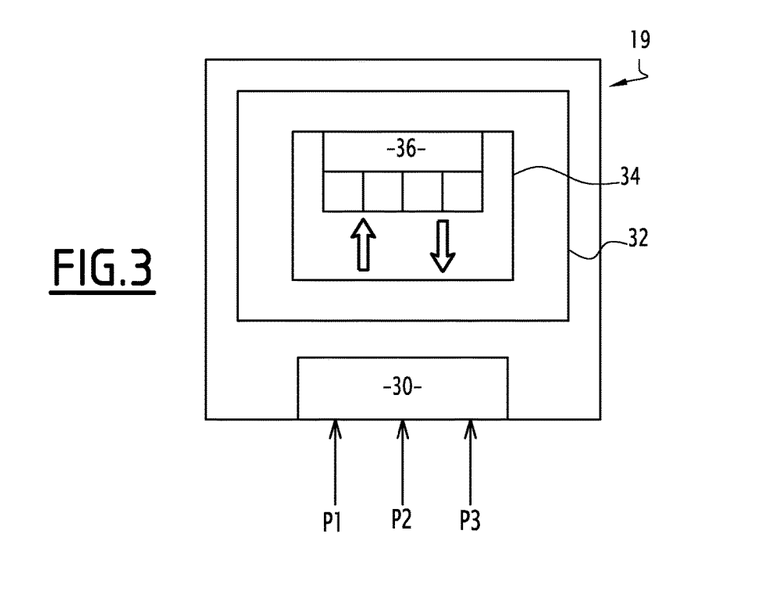
FIG. 3 is a schematic view of a subscriber piece of electronic equipment belonging to the architecture of FIG. 1.

Thus, as illustrated in this FIG. 3, the piece of equipment 19 includes an interface for connection with each of the communication planes P1, P2, P3 and a data processing module connected to this connection interface.

In FIG. 3, the connection interface is designated by the general reference 30 and the data processing module by the general reference 32.

The processing module 32 is able to receive and/or to transmit digital data from and/or to each of the communication planes P1, P2, P3 of the network 12, via the connection interface 30.

According to the invention, the processing module 32 includes a time reference unit giving the possibility of analyzing the time references $RT_{ij}$ from different switches of each of the communication planes to which the piece of equipment 19 is subscribed. This unit is then designated by the general reference 34 in FIG. 3.

More particularly, the time reference unit 34 is able to receive via one or several frames, the current time references $RT_{ij}$ transmitted by the switches 15P1 to 18P1 or 15P2 to 18P2 or 15P3 to 18P3 of the communication planes P1, P2, P3.

The unit 34 is further able to measure the local receiving time aging of each of these received references $RT_{ij}$ in order to generate a piece of local aging information $V_{loc\ receive}(RT_{ij})$ The unit 34 is further able to receive via one or several frames the transmission and crossing aging information $V_{k\ Xmit}(RT_{kj})$, $V_{k\ IS}(RT_{ij})$ and the confidence indexes $I_k(RT_{ij})$ transmitted by at least some of the switches 15P1 to 18P1 or 15P2 to 18P2 or 15P3 to 18P3 of the communication planes P1, P2, P3.

The unit 34 is able to analyze the received current time references $RT_{ij}$, the reception local aging information $V_{loc\ receive}(RT_{ij})$, the received transmission and crossing aging information $V_{k\ Xmit}(RT_{kj})$, $V_{k\ IS}(RT_{ij})$ for generating local confidence indexes $I_{loc}(RT_{ij})$.

Moreover, the unit 34 is able to differentiate the received current references $RT_{ij}$, the received local reception aging information $V_{loc\ Receive}(RT_{ij})$, the transmission aging information $V_{k\ Xmit}(RT_{kj})$ and the received crossing information $V_{k\ IS}(RT_{ij})$, the local confidence indexes $I_{loc}(RT_{ij})$ and the received confidence indexes $I_k(RT_{ij})$ corresponding to these time references $RT_{ij}$, according to the communication plane P1 or P2 or P3.

Finally, for a same communication plane, the unit 34 is able to analyze the received current time references $RT_{ij}$, the local receiving aging information $V_{loc\ receive}(RT_{ij})$, the received transmission and crossing aging information $V_{k\ Xmit}(RT_{kj})$, $V_{k\ IS}(RT_{ij})$, the local confidence indexes $I_{loc}(RT_{ij})$ and the received confidence indexes $I_k(RT_{ij})$ corresponding to these time references, in order to generate a subscriber time reference $RT_A$ for this communication plane, according to a predetermined law LE for generating a subscriber time reference.

For this purpose, the unit 34 includes a memory designated by the general reference 36 in FIG. 3 and able to store the generation law LE.

This generation law LE may for example be configured within the piece of equipment 19 and for example similar to the time reference generation law LC within each of the switches.

Additionally, the unit 34 is able to analyze the received current time references $RT_{ij}$ from the three communication planes P1, P2, P3 as well as the local receiving aging information $V_{loc\ receive}(RT_{ij})$, the received transmission and crossing aging information $V_{k\ Xmit}(RT_{ij})$, $V_{k\ IS}(RT_{ij})$, and/or the confidence indexes $I_{loc}(RT_{ij})$ and $I_k(RT_{ij})$ associated with these time references, in order to generate a common subscriber time reference $RT_{AC}$ for the three communication planes P1, P2, P3 according to the generation law LE or to another predetermined law.

Of course, for a number of communication planes to which the piece of equipment 19 is subscribed, greater than two, the common subscriber time reference $RT_{AC}$ may correspond to the whole of these planes or at least to some of these communication planes.

For example it is obvious that during the operation of the architecture 10, the switches of different switching planes may generate the following time references $RT_{ij+1}$ in an iterative way from the current time references $RT_{ij}$.

The spacing out in time of these iterations may be predetermined by configurations of the network 12.

Further, each subscriber piece of equipment may renew its subscriber time reference $RT_A$ or its common subscriber time reference $RT_{AC}$ at each reception of the current time references $RT_{ij}$ and the corresponding aging information.

Moreover, the contents of each frame T comprising time references $RT_{ij}$ and/or local receiving aging information $V_{loc\ receive}(RT_{ij})$ and/or transmission and/or crossing aging information $V_{k\ Xmit}(RT_{kj})$, $V_{k\ IS}(RT_{ij})$, and/or confidence indexes $I_k(RT_{ij})$ is invariant upon the passing of this frame T through the corresponding switches. This in particular allows transmission of the frames T without degradation of the integrity of the exchanges.

It is then conceivable that such a digital data exchange architecture including a time reference mechanism as described above, may be used in many applications.

In particular, it gives the possibility of ensuring the monitoring of a communication system based on this architecture by for example detecting abnormal frame propagation or crossing delays between the subscriber pieces of equipment.

Further, time referencing at a global level of such a communication system is made possible.

Of course, other embodiments as well as alternatives for applying such an architecture are also possible.

The invention claimed is:

1. An architecture for digital data exchange usable in avionic applications comprising:
    a switched avionic communication network configured to transmit digital data and having at least one communication plane;
    a plurality of subscriber electronic equipment to one or several communication planes of the communication network and configured to transmit and/or receive digital data via the communication network; and
    one or several switches of digital data per communication plane, each switch comprising:
        a digital data switching unit in the communication network;
        a digital data computer processor;
        local interaction unit connecting the switching unit and the digital data computer processor;
        the computer processor being configured to transmit and receive digital data via the local interaction unit, wherein the computer processor of each switch of each communication plane includes modules forming a time reference server, the time reference server associating a time reference with the corresponding switch and configured for:
            generating a local current time reference;
            transmitting this local current time reference generated on the corresponding communication plane via a frame;
            measuring the local transmission time aging of this local current time reference for generating at least one piece of local transmission aging information relative to this time reference;
            transmitting this local transmission aging information generated on the corresponding communication plane via a frame;
            receiving via one or several frames the current time references generated by at least some of the switches of the corresponding communication plane;
            measuring the local receiving time aging of each of the current time references in order to generate at least one piece of local receiving aging information relative to this time reference;
            measuring a local crossing time aging of the switching unit of the current time references in order to generate at least one piece of local crossing aging information relative to this time reference;
            transmitting the local crossing aging information generated on the corresponding communication plane via one or several frames;
            receiving via one or several frames transmission and crossing aging information transmitted by at least some of the other switches of the corresponding communication plane;
            analyzing the received current time references, the local receiving aging information, the received transmission and crossing aging information corresponding to these time references for generating a next local time reference according to a predetermined law for generating a local time reference; and
            associating the next local time reference with the local current time reference.

2. The architecture according to claim 1, wherein the modules forming a time reference server are further configured for:
    generating a local confidence index relative to each received current time reference;
    transmitting this generated local confidence index;
    receiving via one or several frames the confidence indexes transmitted by at least some of the switches of the corresponding communication plane; and
    analyzing the received current time references, the local receiving aging information, the received transmission and crossing aging information, the local confidence indexes and the received confidence indexes corresponding to these time references for generating a next local time reference.

3. The architecture according to claim 2, wherein each piece of subscriber electronic equipment includes a time referencing unit configured for:
    receiving via one or several frames, one or several current time references transmitted by the switches of the communication plane(s) to which the corresponding piece of electronic equipment is subscribed;
    measuring the local receiving time aging of each of the current time references for generating at least one piece of local receiving aging information relative to this time reference;
    receiving via one or several frames, the transmission and crossing aging information transmitted by at least some of the switches of the communication plane(s) to which the corresponding piece of electronic equipment is subscribed;
    receiving a confidence index relative to each received current time reference;
    differentiating the received current time reference(s), the local receiving aging information, the received receiving and crossing aging information and the received confidence indexes corresponding to these time references, according to the transmission communication plane; and
    analyzing the received current time reference(s) from a same communication plane, the local receiving aging information, the received receiving and crossing aging information, and the received confidence indexes corresponding to these time references, in order to generate a subscriber time reference for this communication plane, according to a predetermined law for generating a subscriber time reference.

4. The architecture according to claim 3, wherein the time referencing unit of each piece of subscriber electronic equipment is further configured for analyzing the received current time reference(s), the local receiving aging information, the received receiving and crossing aging information, and the received confidence indexes corresponding to these time references, from different communication planes, to which this piece of equipment is subscribed, in order to generate a common subscriber time reference for at least some of these communication planes, according to a predetermined law for generating a subscriber time reference according to the received confidence indexes.

5. The architecture according to claim 3, wherein the time reference unit of each piece of subscriber electronic equipment is further configured for analyzing the received current time reference(s), the local receiving aging information, the received receiving and crossing aging information, and the received confidence indexes corresponding to these time references, from the whole of the communication planes, to which this piece of equipment is subscribed, in order to generate a common subscriber time reference for this set of communication planes, according to a predetermined law for generating a subscriber time reference according to the received confidence indexes.

6. The architecture according to claim 3, wherein said or each law for generating a subscriber time reference is configured within each piece of subscriber electronic equipment.

7. The architecture according to claim 2, wherein the contents of said or each frame comprising one or several confidence indexes is invariant during each passing of this frame through the switches.

8. The architecture according to claim 1, wherein each switch is configured to transmit each local time reference and/or each piece of transmission local aging information and/or each piece of local crossing aging information and/or each local confidence index via at least two frames passing through physically segregated paths and intended for at least some of the switches of the corresponding switching plane.

9. The architecture according to claim 1, wherein the generation law of a local time reference is configured within each switch.

10. The architecture according to claim 1, wherein each switch further includes a local clock to generate a local current time reference.

11. The architecture according to claim 1, wherein at least some of the communication planes, further include a global clock, at least some of the switches being configured to generate a local current time reference using the global clock.

12. The architecture according to claim 11, wherein the global clock of at least certain of the communication planes, is associated with a group of communication planes.

13. The architecture according to claim 1, wherein each switch is capable of transmitting a local current time reference with the highest priority level in the corresponding communication plane.

14. The architecture according to claim 1, wherein the implementation of the communication network is compliant with the ARINC 664 standard.

15. The architecture according to claim 1, wherein the contents of said or each frame comprises one or several time references and/or one or several pieces of receiving and crossing aging information, is invariant during each passing of this frame through the switches.

* * * * *

UNITED STATES PATENT AND TRADEMARK OFFICE
CERTIFICATE OF CORRECTION

PATENT NO. : 10,218,787 B2
APPLICATION NO. : 14/864332
DATED : February 26, 2019
INVENTOR(S) : Toillon et al.

It is certified that error appears in the above-identified patent and that said Letters Patent is hereby corrected as shown below:

On the Title Page (54) Digital Data Exchange Architecture Usable in Avionic Appliations should be Digital Data Exchange Architecture Usable in Avionic Applications Signed and Sealed this
Twenty-first Day of May, 2019

Andrei Iancu
*Director of the United States Patent and Trademark Office*